(12) United States Patent
Sato et al.

(10) Patent No.: US 8,228,457 B2
(45) Date of Patent: Jul. 24, 2012

(54) LIQUID CRYSTAL DISPLAY DEVICE

(75) Inventors: Takeki Sato, Mobara (JP); Masaki Tsubokura, Mobara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 285 days.

(21) Appl. No.: 12/505,039

(22) Filed: Jul. 17, 2009

(65) Prior Publication Data

US 2010/0014017 A1     Jan. 21, 2010

(30) Foreign Application Priority Data

Jul. 18, 2008     (JP) ................. 2008-186683

(51) Int. Cl.
*G02F 1/1333* (2006.01)

(52) U.S. Cl. ......... 349/58; 362/97.2; 362/225; 362/632; 362/634

(58) Field of Classification Search .................. 362/632, 362/634, 225, 217.12, 217.16
See application file for complete search history.

(56) References Cited

U.S. PATENT DOCUMENTS

| | | | |
|---|---|---|---|
| 7,407,318 B2 * | 8/2008 | Chang | ........................ 362/632 |
| 2006/0028154 A1 | 2/2006 | Shimokawa et al. | |
| 2007/0091589 A1 | 4/2007 | Choi et al. | |

FOREIGN PATENT DOCUMENTS

| | | |
|---|---|---|
| JP | 2001-210126 | 8/2001 |
| JP | 2006-39487 | 2/2006 |
| JP | 2006-286341 | 10/2006 |
| JP | 2007-115693 | 5/2007 |

* cited by examiner

*Primary Examiner* — Richard Kim
(74) *Attorney, Agent, or Firm* — Antonelli, Terry, Stout & Kraus, LLP.

(57) ABSTRACT

A liquid crystal display device includes a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each include a fluorescent lamp supporting member directly supporting the linear fluorescent lamp and a fixing portion fixed to the frame, and a recess is formed in the frame at a portion just behind the fluorescent lamp supporting member.

4 Claims, 10 Drawing Sheets

FIG. 12D

LIQUID CRYSTAL DISPLAY DEVICE

The present application claims priority from Japanese application JP2008-186683 filed on Jul. 18, 2008, the content of which is hereby incorporated by reference into this application.

BACKGROUND OF THE INVENTION

1. Field of the Invention

The present invention relates to a liquid crystal display device and more particularly to a liquid crystal display device including a so-called direct type backlight.

2. Background Art

Liquid crystal display devices use a direct type backlight as a backlight in a large-sized liquid crystal display panel.

Examples of light sources used for such a backlight include cold cathode fluorescent lamps, external electrode fluorescent lamps, and a plurality of LEDs arranged in parallel.

Among these light sources, for example, rod-shaped (linear) light sources such as cold cathode fluorescent lamps or external electrode fluorescent lamps are currently used as a mainstream. These light sources are widely in use because fluorescent lamps can be arranged in parallel to be controlled and can be easily assembled.

Such fluorescent lamps are fixed to the frame of a backlight at their electrodes at both ends.

In recent years, longer fluorescent lamps have come into use along with an increase in size of liquid crystal display devices, and therefore the configuration for supporting the fluorescent lamps is required.

Therefore, a fluorescent lamp including a fluorescent lamp supporting base (pin mold) for fixing the middle portion of the fluorescent lamp to the frame of a backlight has been known. A typical fluorescent lamp supporting base includes a substantially annular fluorescent lamp supporting portion which holds a fluorescent lamp with its elasticity and an engaging portion which functions as a hook inserted into the frame to fix the fluorescent lamp supporting base itself to the frame.

Such liquid crystal display devices are disclosed in JP-A-2001-210126 and JP-A-2006-286341.

SUMMARY OF THE INVENTION

However, the above-described liquid crystal display devices have been pointed out that luminance non-uniformity occurs in the backlight due to the fluorescent lamp supporting base.

That is, since heat generated from the fluorescent lamp is easily transferred to the frame through the fluorescent lamp supporting base, temperature drops at the fluorescent lamp supporting base portion of the fluorescent lamp, resulting in a reduction in luminance at that portion. Therefore, luminance non-uniformity occurs in the fluorescent lamp itself.

It is an object of the invention to provide a liquid crystal display device capable of providing uniform luminance in a direct type backlight using a fluorescent lamp.

For example, the invention can be configured as follows.

(1) A liquid crystal display device of the invention includes, for example, a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each include a fluorescent lamp supporting member holding the linear fluorescent lamp and a fixing portion for fixing the fluorescent lamp supporting base to the frame, and a recess is formed in the frame at a position where the fluorescent lamp supporting member is provided.

(2) A liquid crystal display device of the invention has a feature in that, in (1), for example, the fixing portion of the fluorescent lamp supporting base includes an engaging portion inserted into the frame, and the engaging portion is formed at a position not overlapped with the fluorescent lamp supporting member.

(3) A liquid crystal display device of the invention includes, for example, a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each includes a board formed in parallel with the frame, a fluorescent lamp supporting member formed on the board for directly holding the linear fluorescent lamp, and a fixing portion for fixing the fluorescent lamp supporting base to the frame, and a cavity is formed between the fluorescent lamp supporting member and the board.

(4) A liquid crystal display device of the invention has a feature in that, in (3), for example, the fixing portion of the fluorescent lamp supporting base includes an engaging portion inserted into the frame, and the engaging portion is formed at a position overlapped with the fluorescent lamp supporting member.

(5) A liquid crystal display device of the invention includes, for example, a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each includes a board formed in parallel with the frame, a fluorescent lamp supporting member formed on the board for directly holding the linear fluorescent lamp, and a fixing portion for fixing the fluorescent lamp supporting base to the frame, and a cavity is formed between the board and the frame at a position overlapped with the fluorescent lamp supporting member.

(6) A liquid crystal display device of the invention has a feature in that, in (5), for example, the fixing portion of the fluorescent lamp supporting base includes an engaging portion inserted into the frame, and the engaging portion is formed at a position not overlapped with the fluorescent lamp supporting member.

(7) A liquid crystal display device of the invention includes, for example, a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each includes a fluorescent lamp supporting member directly supporting the linear fluorescent lamp and a fixing portion for fixing the fluorescent lamp supporting base to the frame, and a cavity penetrating in a tube axis direction of the linear fluorescent lamp is formed in the fluorescent lamp supporting member.

(8) A liquid crystal display device of the invention includes, for example, a liquid crystal display panel and a backlight including a light source for irradiating the liquid crystal display panel, in which the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed, the fluorescent lamp supporting bases each includes at least a fluorescent lamp supporting member holding the linear fluorescent lamp, the fluorescent lamp supporting member includes a first supporting member holding part of a surface of the linear fluorescent lamp and a second supporting member supporting part of a surface of the linear fluorescent lamp different from the surface supported by the first supporting member, and the first and second supporting members are shifted from each other in a tube axis direction of the linear fluorescent lamp.

(9) A liquid crystal display device of the invention has a feature in that, in (8), for example, a third supporting member adjacent to the first and second supporting members is further provided, and the third supporting member has the same shape as one of the first and second supporting members.

The above-described configurations are given by way of examples only. The invention can be modified appropriately within a range not departing from the technical idea thereof. Exemplary configurations of the invention other than the above-described configurations will be apparent from the entire description and drawings of the specification.

The thus configured liquid crystal display device can provide uniform luminance in a direct type backlight using a fluorescent lamp.

Other effects of the invention will be apparent from the entire description of the specification.

DETAILED DESCRIPTION OF THE EMBODIMENTS

Embodiments of the invention will be described with reference to the drawings. In the drawings and embodiments, constituent elements having the same or similar function are denoted by the same reference numerals and signs, and the description thereof is omitted.

Embodiment 1

<Overall Configuration>

Figure 2:
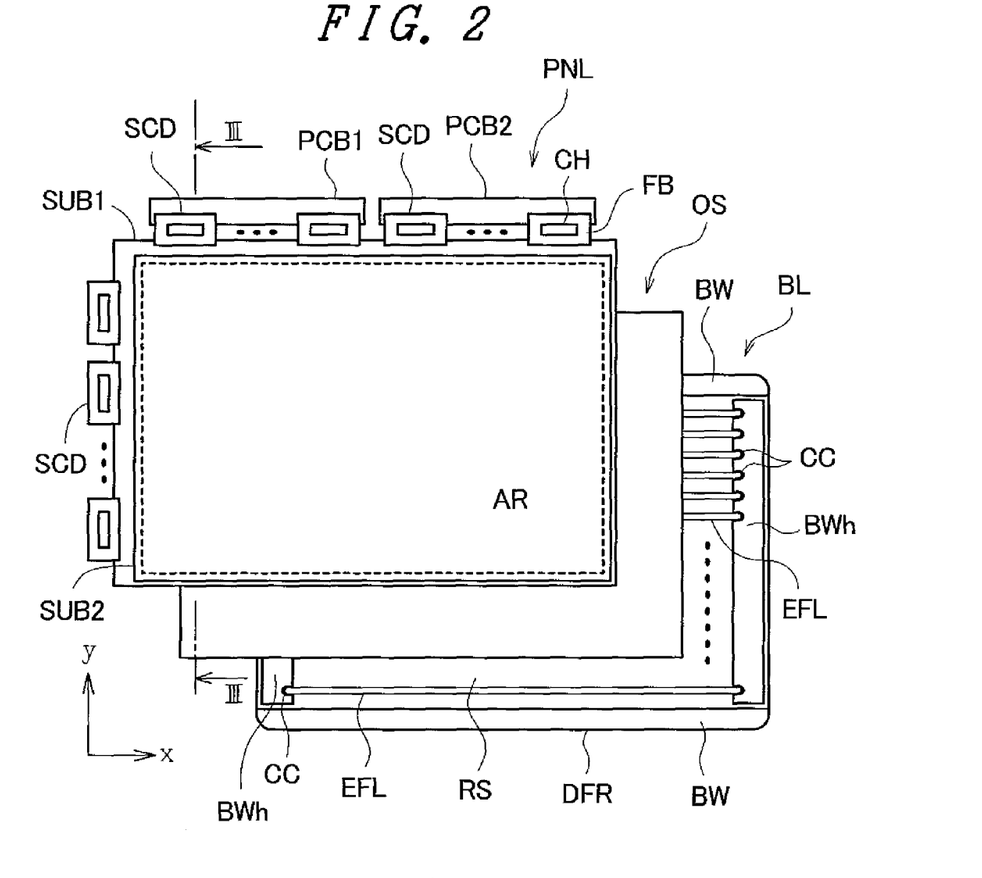
FIG. 2 is an exploded plan view showing the entire liquid crystal display device of the invention.

FIG. 2 is a schematic configuration view showing an embodiment of a liquid crystal display device according to the invention.

A liquid crystal display panel PNL, an optical sheet OS, and a backlight BL are sequentially arranged from the viewer side.

The liquid crystal display panel PNL includes a pair of substrates SUB1 and SUB2 made of, for example, glass and arranged in parallel for forming an envelope and liquid crystal interposed between the substrates SUB1 and SUB2. Pixels (not shown) arranged in a matrix with liquid crystal as one constituent element are formed on surfaces of the substrates SUB1 and SUB2 on the liquid crystal side, so that the light transmissivity of the liquid crystal can be controlled for each pixel. A region where the pixels are formed is defined as a liquid crystal display region AR (region surrounded by the dashed-dotted line in the drawing). The light from the backlight BL, which will be described later, is irradiated onto the entire area of the liquid crystal display region AR, so that a video image can be recognized by a viewer through the light passing through each of the pixels.

The substrate SUB1 arranged rearward with respect to the viewer side has portions exposed from the substrate SUB2 on the left and upper sides thereof in the drawing, for example, and is connected with each one side of a plurality of semiconductor devices SCD in the exposed portions. These semiconductor devices SCD are each composed of, for example, a tape carrier type semiconductor device in which a semiconductor chip CH is mounted on an upper surface of a flexible board FB formed with wiring. The plurality of semiconductor devices SCD (video signal drive circuits) arranged in parallel in the x-direction in the drawing among the semiconductor devices SCD are connected with printed boards PCB1 and PCB2 on one side facing another side connected to the substrate SUB1 and input with an external input signal from a not-shown controller through the printed boards PCB1 and PCB2. The liquid crystal display panel PNL of the embodiment is directed to a large-sized one. The printed boards PCB1 and PCB2 are composed of divided two pieces. The plurality of semiconductor devices SCD (scanning signal drive circuits) arranged in parallel in the y-direction in the drawing among the semiconductor devices SCD are input with an external input signal through wirings (not shown) formed on the surfaces of the printed board PCB1 and the substrate SUB1 and are not provided with printed boards corresponding to the printed boards PCB1 and PCB2.

On the back surface of the liquid crystal display panel PNL, the backlight BL is arranged via, for example, a diffusion sheet and a prism sheet, or the optical sheet OS formed of a stacked body of these sheets. The optical sheet OS diffuses or collects light from the backlight BL depending on objectives so that the light is guided to the liquid crystal display panel PNL side.

The backlight BL, which is referred to as a so-called direct type backlight, includes a plurality of fluorescent lamps (external electrode fluorescent lamps EFL are shown as an example in the embodiment) arranged in parallel in the y-direction in the drawing with the longitudinal direction thereof coinciding with the x-direction in the drawing in a plane parallel to and facing the liquid crystal display panel PNL. The external electrode fluorescent lamps EFL are fixed to a box-shaped lower frame DFR (refer to FIG. 3) made of, for example, metal. In the specification, the lower frame DFR is sometimes referred to as the frame of the backlight. A reflective sheet RS is placed on a surface of the lower frame DFR. Each of upper and lower side portions of the reflective sheet RS extending in the x-direction in the drawing is bent so that the periphery rises to form a side wall surface BW (refer to FIG. 3). On each of right and left side portions of the lower frame DFR extending in the y-direction in the drawing, a side wall plate BWh made of, for example, a resin material is arranged so as to cover electrodes at both ends of the external electrode fluorescent lamps EFL. The side wall plate BWh is inclined so as to be high on its outer side. The side wall plate BWh is formed with notches CC in its lower side portion for avoiding interference with the external electrode fluorescent lamps EFL. The side wall plates BWh each has a light reflecting function on the surface on the liquid crystal display panel PNL side and constitute the substantial side wall portion of the backlight BL together with the side wall surfaces BW of the reflective sheet RS. The configuration of the backlight BL will be described later in more detail.

<Configuration for Module>

Figure 3:
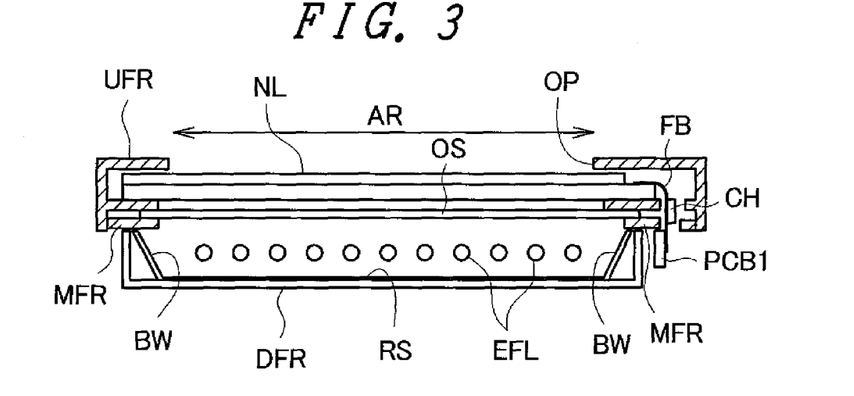
FIG. 3 is a cross sectional view taken along the line III-III in FIG. 2.

As shown in FIG. 3, the liquid crystal display device includes an upper frame UFR and a middle frame MFR stacked on the lower frame DFR of the backlight BL. The liquid crystal display device is formed into a module with the liquid crystal display panel PNL and the optical sheet OS arranged between the upper frame UFR and the middle frame MFR. FIG. 3 shows a cross section corresponding to the line III-III in FIG. 2. The upper frame UFR is formed with an opening OP for exposing at least the liquid crystal display region AR of the liquid crystal display panel PNL on the viewer side. The semiconductor devices SCD connected to the substrate SUB1 of the liquid crystal display panel PNL are bent at the flexible board FB at right angles and arranged on the side surface of the lower frame DFR for narrowing the frame.

In FIG. 3, fluorescent lamp supporting bases LSS which support the external electrode fluorescent lamps EFL (tube portions not formed with electrodes) with respect to the lower frame DFR and recesses DNT formed on the lower frame DFR just behind the fluorescent lamp supporting bases LSS are omitted. These configurations will be described later.

<Backlight BL>

Figure 4:
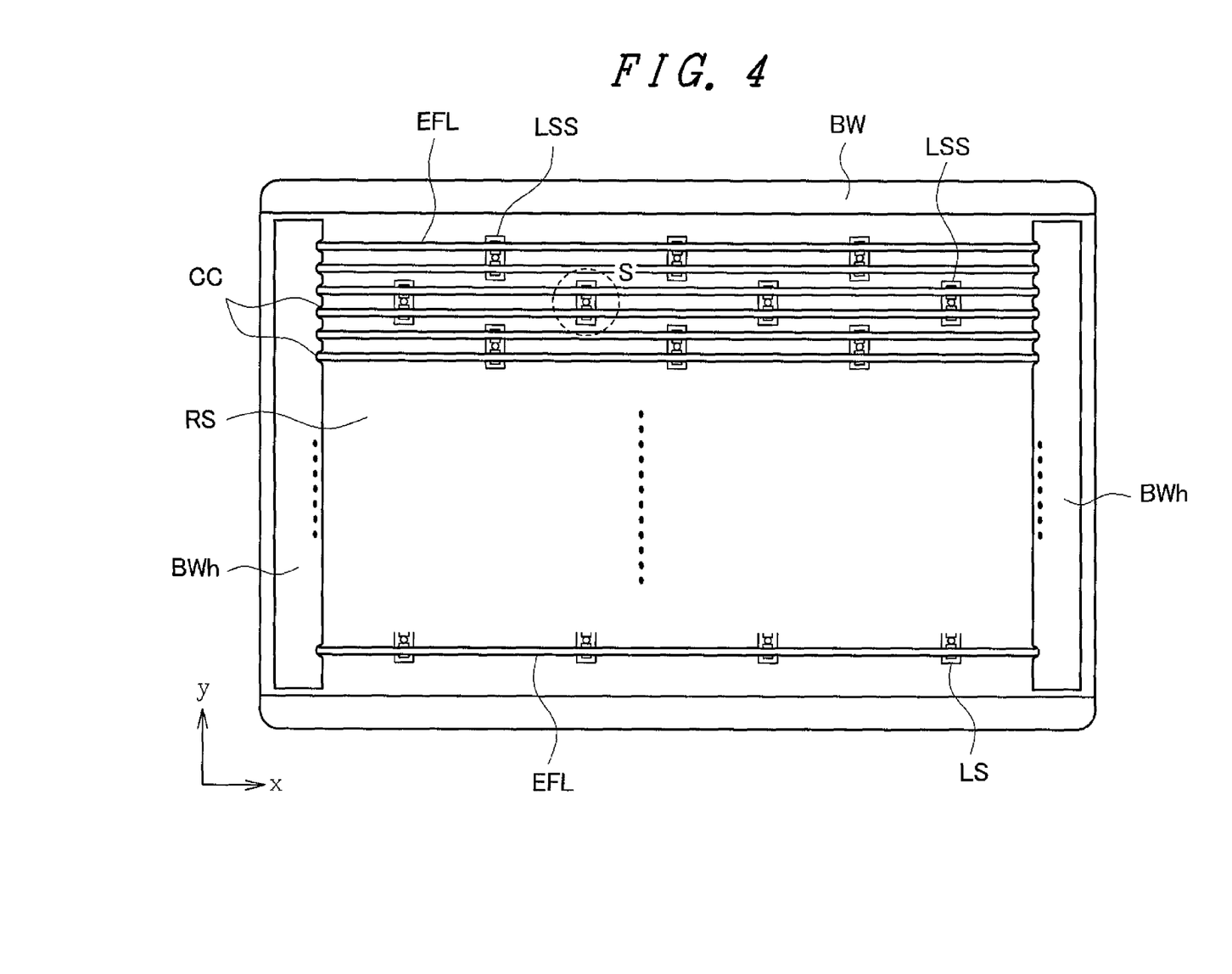
FIG. 4 is a configuration view showing a backlight of the liquid crystal display device of the invention, which is a plan view showing a state where side wall plates BWh are provided.

FIG. 4 is an enlarged view showing only the backlight BL in FIG. 2. In FIG. 4, the fluorescent lamp supporting bases LSS which are not shown in FIG. 2 are shown. The fluorescent lamp supporting bases LSS are fixed to the lower frame DFR so as to support the tube portions of the external electrode fluorescent lamps EFL. The external electrode fluorescent lamp EFL is supported by the lower frame DFR also at the electrode portions at both ends via electrode fittings TMF (refer to FIG. 6). However, when a longer external electrode fluorescent lamp EFL is used along with an increase in size of liquid crystal display devices, the longer external electrode fluorescent lamp cannot be sufficiently supported only at the electrode portions. Therefore, the fluorescent lamp supporting bases LSS are arranged for supporting also the tube portion which is the middle portion of the fluorescent lamp. In the embodiment shown in FIG. 4, for example, two external electrode fluorescent lamps EFL which are arranged side by side can be supported by one fluorescent lamp supporting base LSS. The fluorescent lamp supporting bases LSS are arranged in plural numbers along the longitudinal direction of the external electrode fluorescent lamp EFL at, for example, regular intervals. Other two external electrode fluorescent lamps EFL which are arranged adjacent to the above-described two external electrode fluorescent lamps EFL are also supported by the plurality of fluorescent lamp supporting bases LSS along the longitudinal direction. However, these fluorescent lamp supporting bases LSS are arranged at positions shifted from the fluorescent lamp supporting bases LSS which support the above-described two external electrode fluorescent lamps EFL. This is to avoid a reduction in luminance occurring at a portion where the fluorescent lamp supporting bases LSS are aligned in line.

In the fluorescent lamp supporting base LSS used in the embodiment, an optical sheet supporting post OSP (refer to FIG. 7) is formed at the center of a portion where two external electrode fluorescent lamps EFL are supported. The fluorescent lamp supporting base LSS has also a function for supporting the optical sheet OS. The fluorescent lamp supporting base LSS can support the optical sheet OS with a predetermined gap with respect to the lower frame DFR with the optical sheet supporting post OSP.

The configuration of the fluorescent lamp supporting base LSS will be described later in more detail using FIG. 7.

Figure 5:
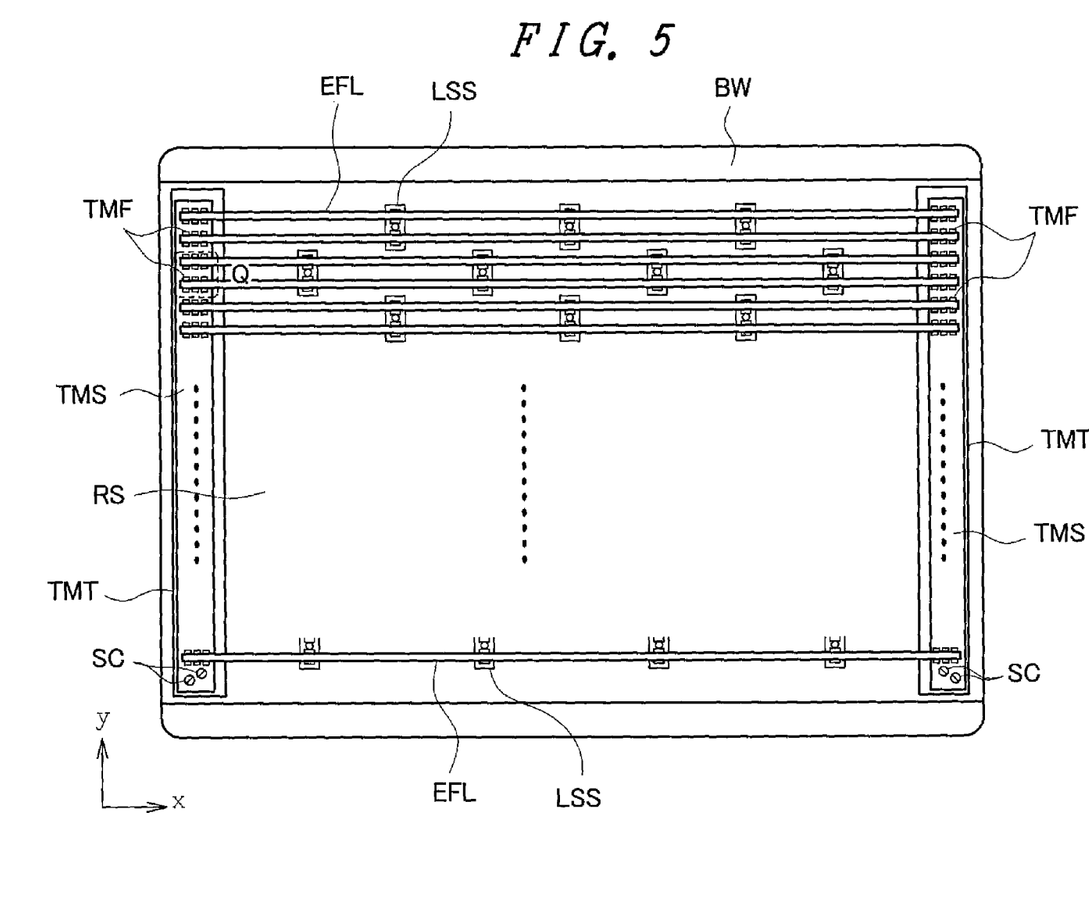
FIG. 5 is a configuration view showing the backlight of the liquid crystal display device of the invention, which is a plan view showing a state where the side wall plates BWh are removed.

FIG. 5 shows a state where the side wall plates BWh are detached from the backlight BL shown in FIG. 4. As described above, the side wall plate BWh is made of, for example, a resin material and arranged in each of the right and left side portions of the lower frame DFR extending in the y-direction in the drawing so as to cover the electrodes of the external electrode fluorescent lamp EFL at both ends while being inclined so as to be high on its outer side. Each of the side wall plates BWh is stacked on an electrode supporting base TMT fixed on the lower frame DFR and made of, for example, a resin material. As shown in FIG. 5, when the side wall plates BWh are detached from the electrode supporting bases TMT, electrode supporting members TMS arranged on the surface of the electrode supporting bases TMT are exposed. For example, one of the electrode supporting members TMS in the drawing includes the electrode fittings TMF which support and electrically connect the electrodes of the external electrode fluorescent lamps EFL arranged in parallel together. The other electrode supporting member TMS is configured in the same manner. The electrode supporting member TMS is formed by press working together with the electrode fittings TMF.

<Electrode Supporting Member TMS>

Figure 6A:
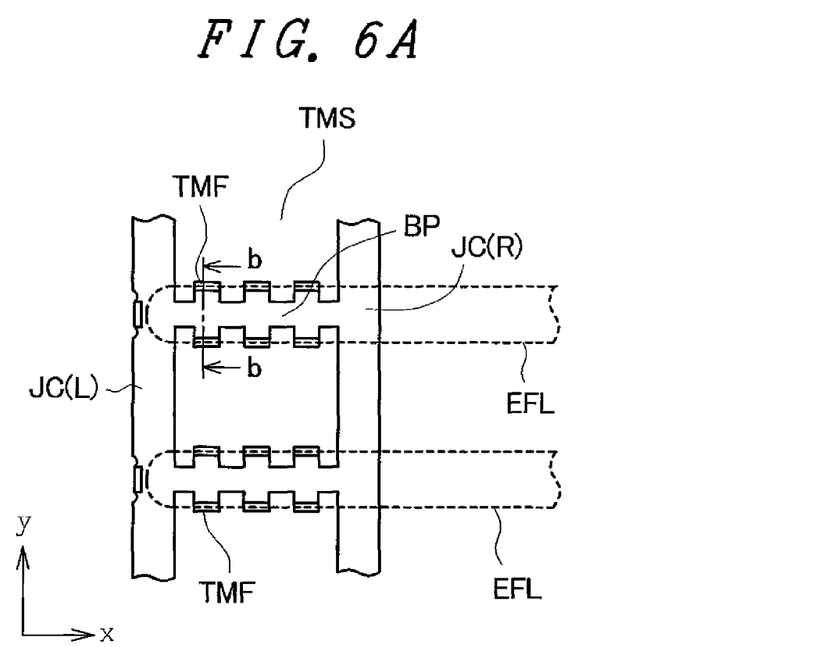
FIGS. 6A and 6B are configuration views showing an electrode supporting member TMS provided in the backlight.

FIG. 6A is a plan view showing an embodiment of the electrode supporting member TMS, showing a portion Q surrounded by the dotted frame in FIG. 5 in an enlarged fashion. In FIG. 6A, the electrode supporting member TMS includes base portions BP each of which fixes three electrode fittings TMF arranged in parallel together and a left-side connecting portion JC(L) and a right-side connecting portion JC(R) connected to respective ends of the base portions BP. The base portions BP and both of the connecting portions JC(L) and JC(R) are formed to have a ladder-shaped pattern as viewed in a plan view.

Figure 6B:
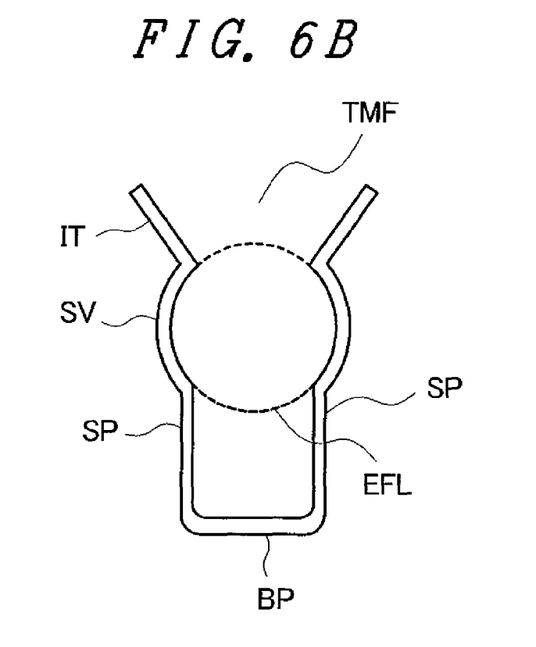

FIG. 6B is a cross sectional view taken along the line b-b in FIG. 6A, showing the electrode fitting TMF. The electrode fitting TMF is configured so as to interpose the electrode portion of the external electrode fluorescent lamp EFL from both sides. That is, the electrode fitting TMF includes a pair of supporting portions SP which are bent in, for example, the vertical direction from both sides of the base portions BP of the electrode supporting member TMS. These supporting portions SP include pressing portions SV which push the electrode portion of the external electrode fluorescent lamp EFL respectively from the facing sides of a peripheral surface (indicated by the dotted circle in the drawing). Each of the pressing portions SV has an arcuate shape whose concave surface is formed on the peripheral surface (indicated by the dotted circle in the drawing) side of the electrode portion of the external electrode fluorescent lamp EFL. The electrode fitting TMF includes introduction portions IT which are formed at ends of the supporting portions SP so as to extend radially from the ends. These introduction portions IT are formed to facilitate the introduction of the external electrode fluorescent lamp EFL into the supporting portions SP.

(Fluorescent Lamp Supporting Base LSS)

Figures 7A, 7B:
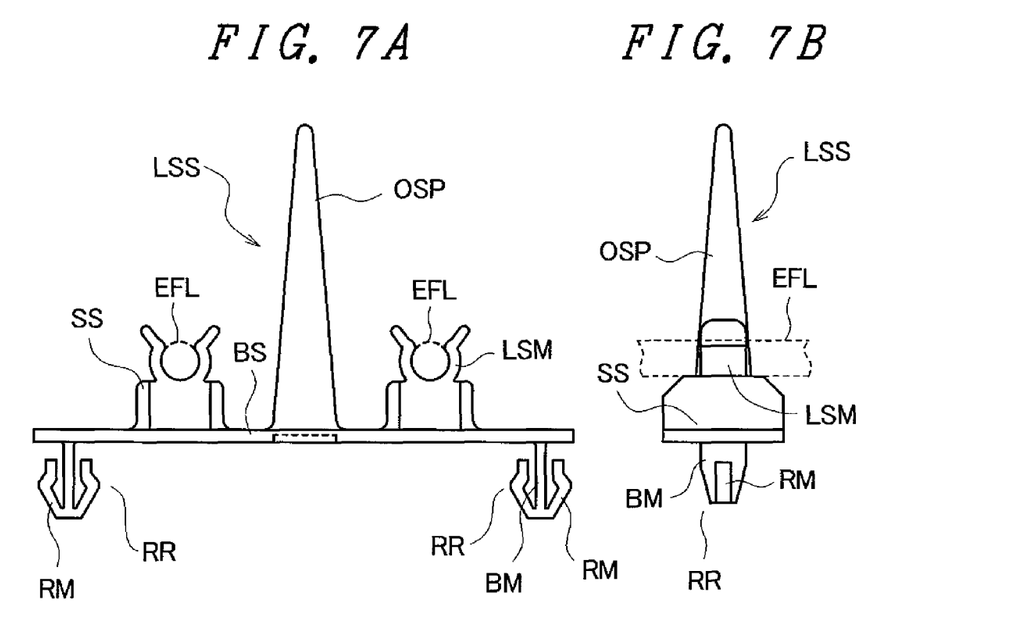
FIGS. 7A to 7C are configuration views showing Embodiment 1 of the fluorescent lamp supporting base LSS provided in the liquid crystal display device of the invention.
Figure 7C:
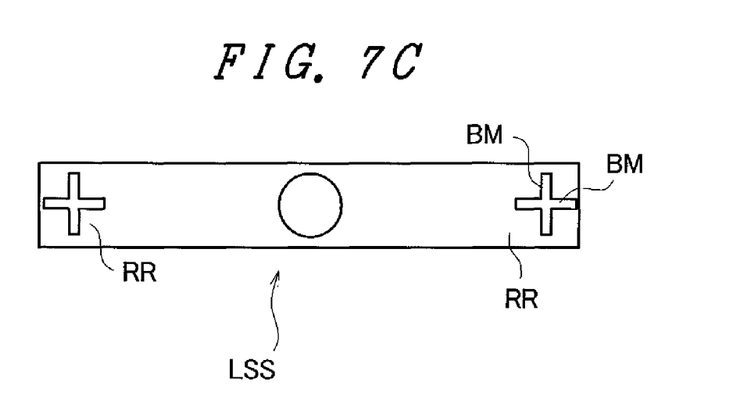

FIGS. 7A to 7C are configuration views showing the fluorescent lamp supporting base LSS which is shown in a dotted circle S in FIG. 4. The fluorescent lamp supporting base LSS shown in FIGS. 7A to 7C is not attached to the lower frame DFR.

FIG. 7A shows the fluorescent lamp supporting base LSS as viewed from a side surface thereof in the long side direction. FIG. 7B shows the fluorescent lamp supporting base LSS as viewed from a side surface thereof in the short side direction. FIG. 7C is a bottom plan view of the fluorescent lamp supporting base LSS.

The fluorescent lamp supporting base LSS is configured as, for example, a resin integrally-molded article. First, the fluorescent lamp supporting base LSS has a plate-like board BS. The optical sheet supporting post OSP is formed at the center of the board BS. A fluorescent lamp supporting member LSM is formed on both sides of the optical sheet supporting post OSP.

The optical sheet supporting post OSP is formed as, for example, a conical, columnar body which is larger in diameter on the board BS side and is smaller in diameter as it approaches its top.

The fluorescent lamp supporting member LSM is formed on the upper surface of a mounting base SS which is formed to have a predetermined height on the surface of the board BS. The mounting base SS adjusts the level of the external electrode fluorescent lamp EFL from the lower frame DFR. The fluorescent lamp supporting member LSM is formed of a bifurcated member extending from the surface of the mounting base SS in an erected manner. The fluorescent lamp supporting member LSM includes a tube clamping portion pressing the tube side surface of the external electrode fluorescent lamp EFL and a tube inserting portion extending outwardly from the tube clamping portion for facilitating the insertion of the tube of the external electrode fluorescent lamp EFL.

As shown in FIG. 7C, engaging portions RR for engaging the lower frame DFR are formed on the back surface of the board BS. Each of the engaging portions RR includes pawl-like engaging members RM which are formed so as to curve from the top of a base member BM planted on the board BS and thereafter extend toward the base member BM side. The engaging member RM has elasticity. Two engaging portions RR are provided on the back surface of the board BS and each positioned on the outer side of the fluorescent lamp supporting members LSM as viewed from the optical sheet supporting post OSP. The engaging portions RR may be each positioned on the inner side of the fluorescent lamp supporting members LSM as viewed from the optical sheet supporting post OSP. In short, the engaging portion RR is formed so as to avoid the location just behind the fluorescent lamp supporting member LSM. This is because the recess DNT need to be provided on the lower frame DFR at a portion just behind the fluorescent lamp supporting member LSM of the fluorescent lamp supporting base LSS (refer to FIG. 1), as will be described later.

Figure 1A:
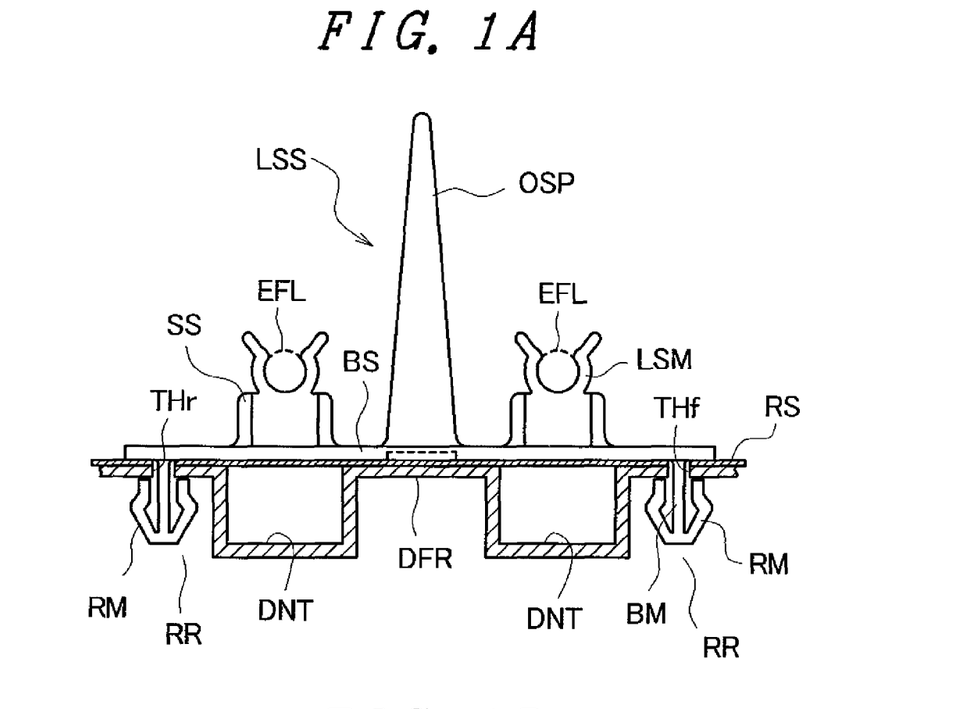
FIGS. 1A and 1B are configuration views showing Embodiment 1 of a fluorescent lamp supporting base LSS provided in a liquid crystal display device of the invention, showing a state where the fluorescent lamp supporting base LSS is attached to a lower frame.
Figure 1B:
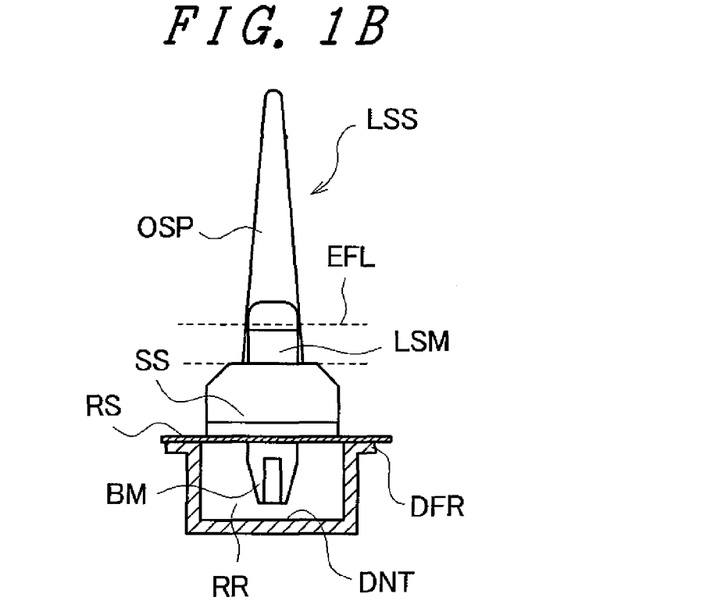

FIGS. 1A and 1B show the configuration of the fluorescent lamp supporting base LSS and the lower frame DFR in the case where the fluorescent lamp supporting base LSS is attached to the lower frame DFR. FIG. 1A corresponds to FIG. 7A, while FIG. 1B corresponds to FIG. 7B.

In FIGS. 1A and 1B, the reflective sheet RS is placed on the surface of the lower frame DFR on the side where the external electrode fluorescent lamps EFL are mounted. A pair of holes THr and THf are formed through the reflective sheet RS and the lower frame DFR. Each of the engaging portions RR of the fluorescent lamp supporting base LSS is inserted into the holes THr and THf. The diameter of the holes THr and THf is smaller than the lateral width of the engaging member RM under normal state. After passing through the holes THr and THf, the engaging members RM of the engaging portions RR recover the normal shape due to their elasticity. Thereafter, the engaging members RM serve as stoppers to engage the fluorescent lamp supporting base LSS to the lower frame DFR.

In the mounting location of the fluorescent lamp supporting base LSS on the lower frame DFR, the recesses DNT are formed at portions just behind the fluorescent lamp supporting members LSM. The recess DNT is configured so as to have a bottom surface relatively far apart from the bottom surface of the fluorescent lamp supporting base LSS. From this fact, an air layer having a relatively great thickness is formed just behind each of the fluorescent lamp supporting bases LSS due to the recess DNT. Since the thermal conductivity of air is extremely low as compared to that of other material, the air layer formed by the recess DNT functions as a thermal transfer blocking member. In the embodiment, the depth of the recess DNT (thickness of air layer) is set at least to the height of the fluorescent lamp supporting base LSS for supporting the external electrode fluorescent lamp EFL (=gap between the lower frame DFR and the external electrode fluorescent lamp EFL).

(Discussion of Thickness of Air Layer)

The depth of the recess DNT of the lower frame DFR shown in FIG. 1, that is, the thickness of the air layer will be discussed below for bringing a thermal resistance close to equal to that of the case where the fluorescent lamp supporting base LSS is not closely attached to the external electrode fluorescent lamp EFL.

Figure 12A:
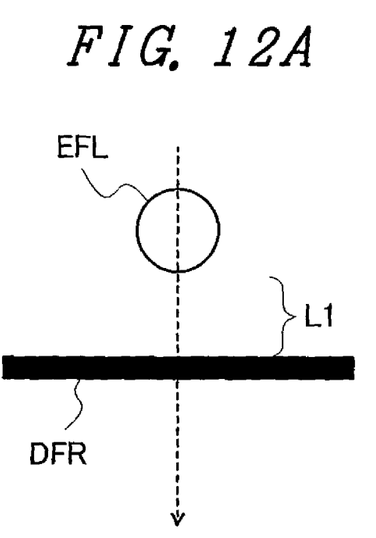
FIG. 12A to 12D are concept views for discussing the thickness of an air layer.
Figure 12B:
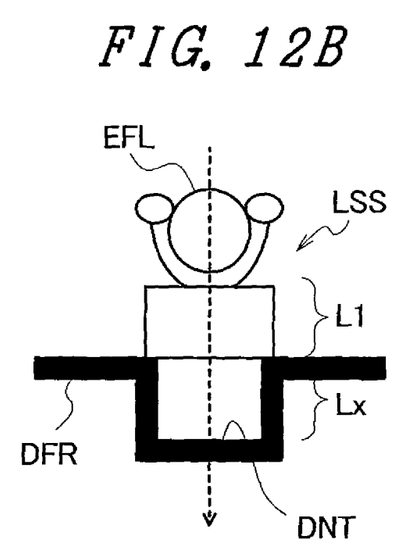

FIG. 12A is a cross sectional view at a position where the fluorescent lamp supporting base LSS of the external electrode fluorescent lamp EFL is not present, showing the external electrode fluorescent lamp EFL arranged above the plate-like lower frame DFR with a gap L1. FIG. 12B is a cross sectional view at a position where the fluorescent lamp supporting base LSS of the external electrode fluorescent lamp EFL is present, and the recess DNT is formed on the lower frame DFR, showing the embodiment shown in FIG. 1 by modeling it. In FIG. 12B, the height of the fluorescent lamp supporting base LSS is indicated by L1, and the depth of the recess DNT is indicated by Lx.

Figure 12C:
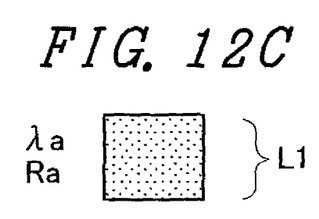
Figure 12D:
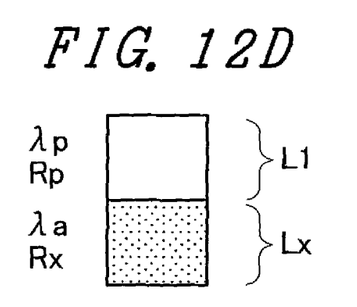

In this discussion, thermal transfer from the external electrode fluorescent lamp EFL is restricted in directions indicated by dotted arrows in FIGS. 12A and 12B for simplification. FIG. 12C shows a thermal transfer medium in the direction of arrow in FIG. 12A, while FIG. 12D shows thermal transfer media in the direction of arrow in FIG. 12B, both in a simplified manner. That is, FIG. 12C shows that the air layer with the thickness of L1 between the external electrode fluorescent lamp EFL and the lower frame DFR is a thermal transfer medium, while FIG. 12D shows that the fluorescent lamp supporting base LSS with the thickness L1 between the external electrode fluorescent lamp EFL and the lower frame DFR and the air layer with the thickness Lx of the recess DNT are thermal transfer media.

In the embodiment, it is intended that the thermal resistance between the external electrode fluorescent lamp EFL and the lower frame DFR in FIG. 12B be equivalent to that between the external electrode fluorescent lamp EFL and the lower frame DFR configured as shown in FIG. 12A.

In general, a thermal resistance R of a material (including air) in contact with a heat source is expressed by the following equation (1):

$$R = L[m] / \{\lambda[W/m\cdot°C.] \times A[m^2]\} \quad (1)$$

where L is a length of the material in contact with the heat source in a heat transfer direction, $\lambda$ is a thermal conductivity of the material in contact with the heat source, and A is an area of contact between the heat source and the material in contact therewith.

Here, a thermal resistance of the air layer between the external electrode fluorescent lamp EFL and the lower frame DFR shown in FIGS. 12A and 12C is defined as Ra, a thermal resistance of the fluorescent lamp supporting base LSS shown in FIGS. 12B and 12D is defined as Rp, and a thermal resistance of the air layer between the fluorescent lamp supporting base LSS and the lower frame DFR is defined as Rx.

As described above, in order to make the thermal resistance between the external electrode fluorescent lamp EFL and the lower frame DFR in FIG. 12B equivalent to that between the external electrode fluorescent lamp EFL and the lower frame DFR configured as shown in FIG. 12A, the following equation (2) is to be satisfied:

$$Ra = Rp + Rx$$

$$Rx = Ra - Rp \quad (2)$$

Substitution of the equation (1) into the equation (2) yields the following equation (3):

$$Lx = L1(1 - \lambda a/\lambda p) \quad (3)$$

where $\lambda p$ is the thermal conductivity of the fluorescent lamp supporting base LSS, and $\lambda a$ is the thermal conductivity of the air layer.

In the embodiment, the thermal conductivity $\lambda p$ of a resin used for the fluorescent lamp supporting base LSS is 0.23, and the thermal conductivity $\lambda a$ of the air layer is 0.02614. Substitution of the numerical values of the thermal conductivities into the equation (3) yields the following equation (4):

$$Lx = 0.89 \times L1 \quad (4)$$

That is, it is clear from the equation (4) that the depth Lx of the recess DNT needs to be about 90% or more of the height of the fluorescent lamp supporting base LSS. Therefore, in practice, if the depth of the recess DNT (thickness of air layer) of the lower frame DFR is made to be substantially equal to the height of the fluorescent lamp supporting base LSS (Lx≅L1), thermal condition can be sufficiently equal to that in the case where the fluorescent lamp supporting base LSS is not attached.

Therefore, in the embodiment, the recess DNT having a depth equal to or greater than the fluorescent lamp supporting base LSS (L1) is provided below the fluorescent lamp supporting base LSS supporting the external electrode fluorescent lamp EFL, whereby thermal condition at a position of the fluorescent lamp supporting base LSS can be equivalent to that at a position where the fluorescent lamp supporting base LSS is not present. Since this can largely suppress heat dissipation from the supporting portions of the external electrode fluorescent lamp EFL due to the fluorescent lamp supporting base LSS, the temperature difference of the external electrode fluorescent lamp EFL in a tube axis direction can be reduced irrespective of the presence or absence of the fluorescent lamp supporting base LSS. Accordingly, the luminance difference of the external electrode fluorescent lamp EFL in the tube axis direction can be reduced, whereby a planar light source having uniform luminance can be provided in the backlight BL. The configuration shown in Embodiment 1 can be used in combination with Embodiment 2 and subsequent embodiments.

Embodiment 2

FIG. 8 shows Embodiment 2 of the invention, showing another embodiment of the fluorescent lamp supporting base LSS in association with FIG. 1.

First, the configuration of FIG. 8 differs from that of FIG. 1 in a mounting base SS on which the fluorescent lamp supporting member LSM formed of a bifurcated member is planted. A cavity TN is formed in the mounting base SS. The cavity TN is formed just below the fluorescent lamp supporting member LSM along the tube axis direction of the external electrode fluorescent lamp EFL. That is, the fluorescent lamp supporting member LSM is supported by the mounting base SS constituting the wall surface portion of the cavity TN.

According to the discussion in Embodiment 1, the height of the cavity TN in the embodiment is set to be larger than the thickness of the fluorescent lamp supporting base LSS present between the external electrode fluorescent lamp EFL and the lower frame DFR.

In the thus configured mounting base SS, an air layer can be present just below the fluorescent lamp supporting member LSM directly supporting the external electrode fluorescent lamp EFL, heat transferred from the external electrode fluorescent lamp EFL can be blocked by the air layer, and the transfer of the heat to the board BS and the lower frame DFR side can be reduced as much as possible.

Figure 8A:
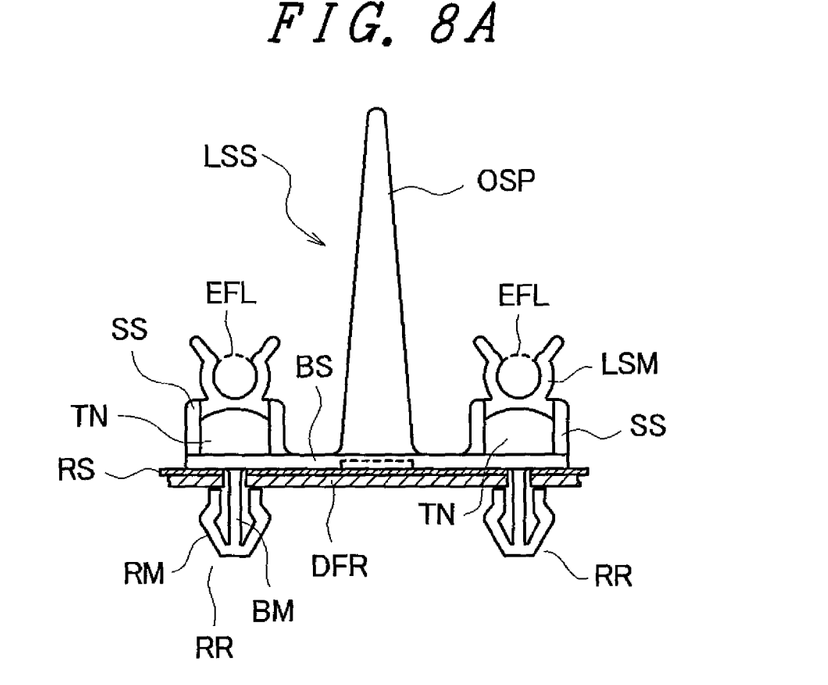
FIGS. 8A and 8B are configuration views showing Embodiment 2 of the fluorescent lamp supporting base LSS provided in the liquid crystal display device of the invention, showing the state where the fluorescent lamp supporting base LSS is attached to the lower frame.

In this case, there is no need to form the lower frame DFR so as to have a special shape, unlike Embodiment 1. Therefore, as shown in FIG. 8A, the engaging portion RR of the fluorescent lamp supporting base LSS may be formed on the board BS just behind the fluorescent lamp supporting member LSM and the mounting base SS.

The configuration shown in Embodiment 2 can be used in combination with embodiments other than Embodiment 2.

Embodiment 3

Figure 9:
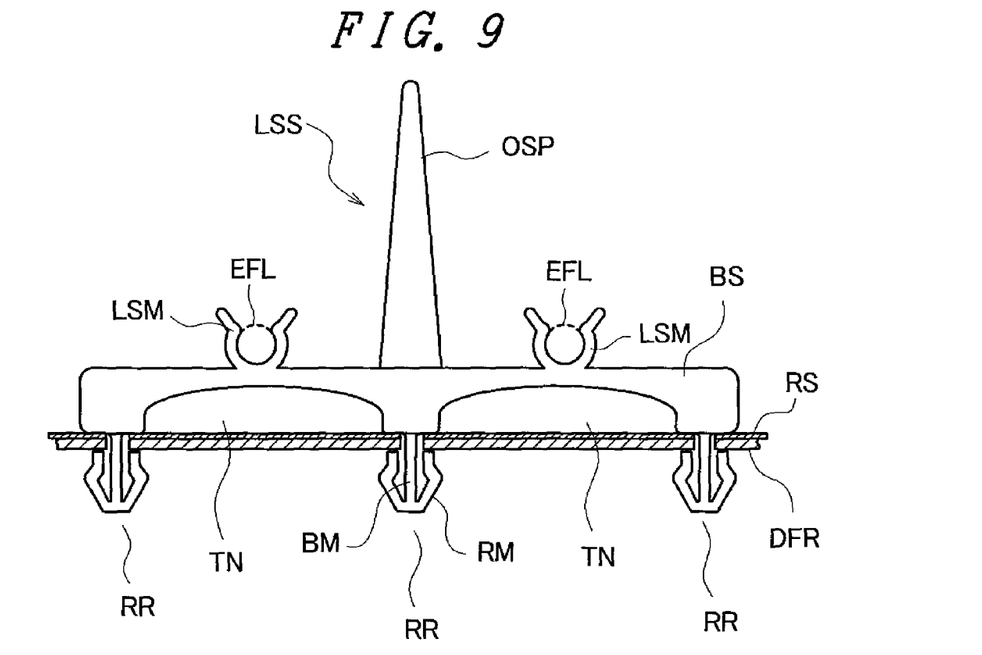
FIG. 9 is a configuration view showing Embodiment 3 of the fluorescent lamp supporting base LSS provided in the liquid crystal display device of the invention, showing the state where the fluorescent lamp supporting base LSS is attached to the lower frame.

FIG. 9 shows Embodiment 3 of the invention, showing another embodiment of the fluorescent lamp supporting base LSS.

Embodiment 3 is configured such that the cavity TN is provided just below the fluorescent lamp supporting member LSM in the same manner as in Embodiment 2. According to the discussion in Embodiment 1, the height of the cavity TN in the embodiment is set to be larger than the thickness of the fluorescent lamp supporting base LSS present between the external electrode fluorescent lamp EFL and the lower frame DFR.

Accordingly, the heat transferred from the external electrode fluorescent lamp EFL can be blocked by the air layer in the cavity TN, and the transfer of the heat to the board BS and the lower frame DFR side can be reduced as much as possible in the same manner as in Embodiment 2.

Embodiment 3 differs from the configuration of FIG. 8A in that the board BS of the fluorescent lamp supporting base LSS is formed thick so as to have the function of the mounting base SS shown in FIG. 8A. In addition, the length of the board BS is greater than that of the configuration of FIG. 8A.

Therefore, on the bottom surface of the board BS, portions where the cavities TN are not formed are, for example, the both ends of the board BS and the center where the optical sheet supporting post OSP is formed. The engaging portion RR is formed at, for example, the both ends and center of the bottom surface of the board BS.

In the thus configured board BS, the cavity TN having a larger capacity is formed just below each of the fluorescent lamp supporting members LSM, whereby a higher heat insulating effect can be provided.

The configuration shown in Embodiment 3 can be used in combination with embodiments other than Embodiment 3.

Embodiment 4

Figure 10:
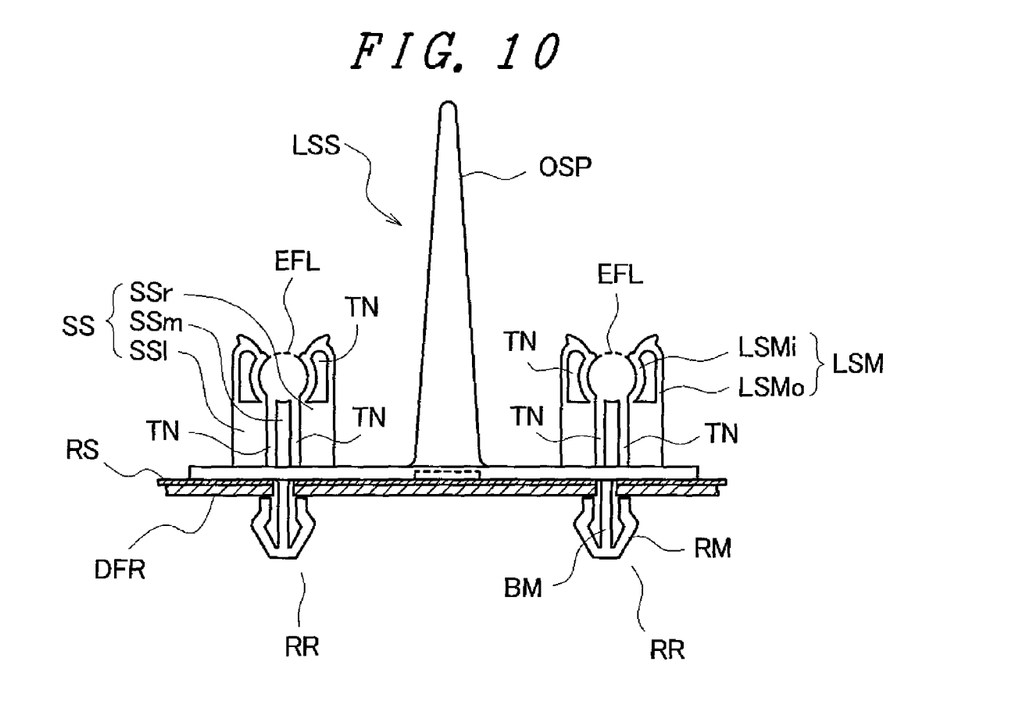
FIG. 10 is a configuration view showing Embodiment 4 of the fluorescent lamp supporting base LSS provided in the liquid crystal display device of the invention, showing the state where the fluorescent lamp supporting base LSS is attached to the lower frame.

FIG. 10 shows Embodiment 4 of the invention, showing another embodiment of the fluorescent lamp supporting base LSS. The configuration of FIG. 10 differs from that of FIG. 8A in the fluorescent lamp supporting member LSM and the mounting base SS.

In the fluorescent lamp supporting member LSM, each member of the bifurcated member extending from the upper surface of the mounting base SS in an erected manner is formed to have a relatively large thickness (width in a diameter direction of the external electrode fluorescent lamp EFL), and the cavity TN is formed at the center of the member along the tube axis direction of the external electrode fluorescent lamp EFL. That is, each of the members of the bifurcated member of the fluorescent lamp supporting member LSM includes a portion LSMi in direct contact with the external electrode fluorescent lamp EFL and a portion LSMo extending outwardly while bypassing the cavity TN interposed therebetween. This can improve the reliability of the mechanical strength of the fluorescent lamp supporting member LSM as well as make it difficult to transfer the heat from the external electrode fluorescent lamp EFL to the mounting base SS side.

The mounting base SS includes a portion SSm supporting the surface of the external electrode fluorescent lamp EFL at the bottom, a portion SS1 supporting one side of the fluorescent lamp supporting member LSM, and a portion SSr supporting the other side of the fluorescent lamp supporting member LSM. The mounting base SS is configured so as to have gaps (cavities TN) each including an air layer among the portions SSm, SS1, and SSr. Thus, the mounting base SS hardly transfers the heat from the fluorescent lamp supporting member LSM to the board BS and the lower frame DFR side.

The configuration shown in Embodiment 4 can be used in combination with embodiments other than Embodiment 4.

Embodiment 5

Figure 11A:
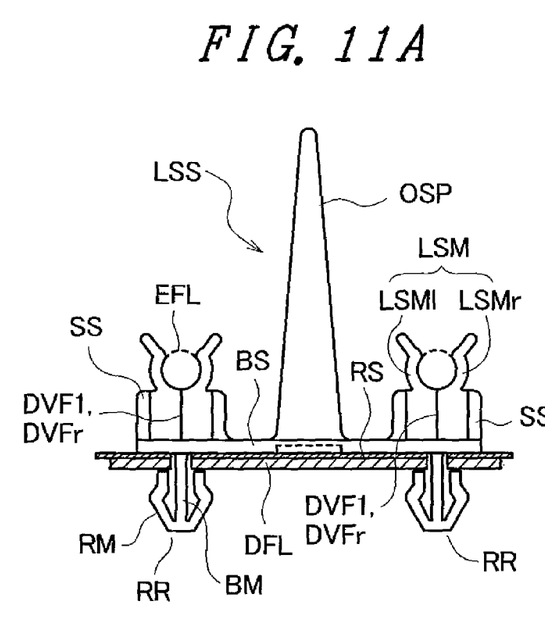
FIG. 11A to 11C are configuration views showing Embodiment 5 of the fluorescent lamp supporting base LSS provided in the liquid crystal display device of the invention, showing the state where the fluorescent lamp supporting base LSS is attached to the lower frame.
Figure 11B:
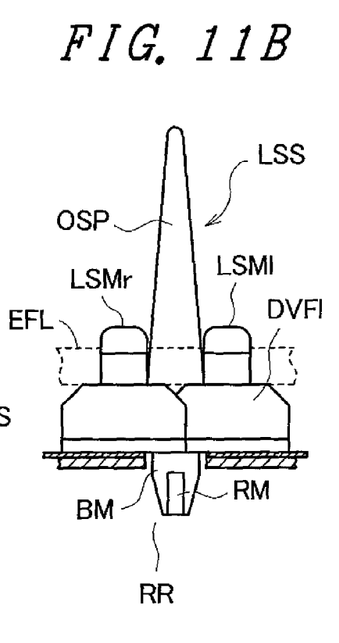
Figure 11C:
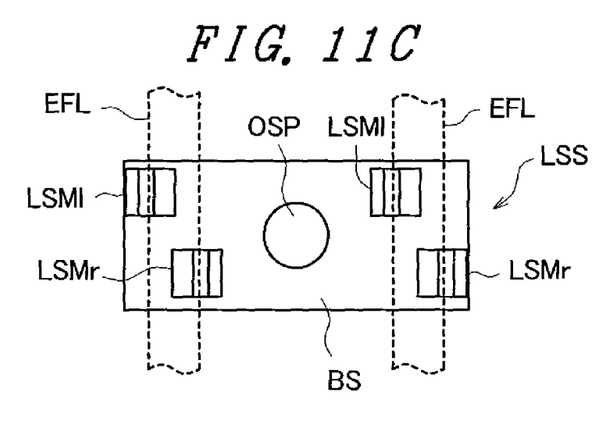

FIGS. 11A to 11C show Embodiment 5 of the invention, showing another embodiment of the fluorescent lamp supporting base LSS. FIG. 11A shows the fluorescent lamp supporting base LSS as viewed from the side surface thereof in the long side direction, FIG. 11B shows the fluorescent lamp supporting base LSS as viewed from the side surface thereof in the short side direction, and FIG. 11C is a plan view of the fluorescent lamp supporting base LSS as viewed from above.

Figure 8B:
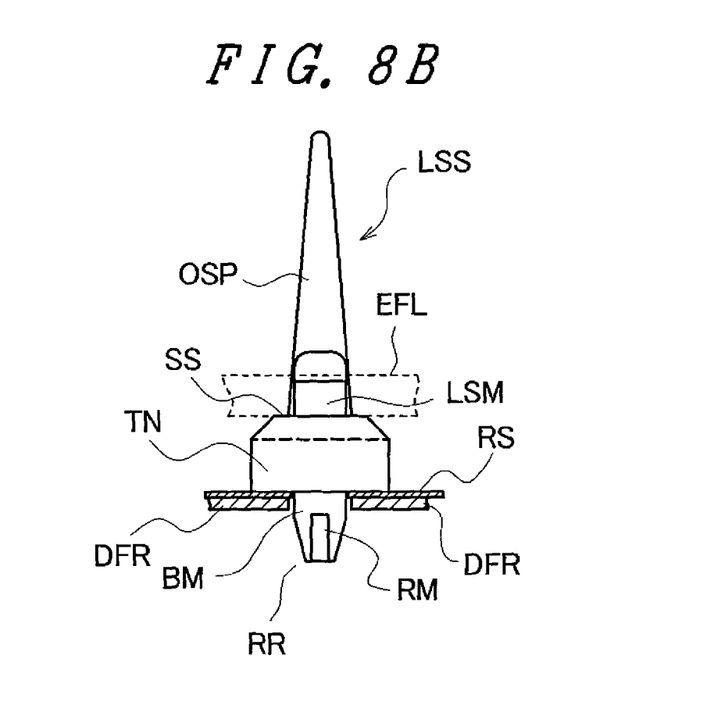

First, the configuration of FIGS. 11A to 11C differs from that shown in FIGS. 8A and 8B in that the cavity TN is not formed in each of the mounting bases SS. In addition, the fluorescent lamp supporting member LSM and the mounting base SS supporting the fluorescent lamp supporting member are formed so as to be divided into right and left portions (in the diameter direction of the external electrode fluorescent lamp EFL), and the divided fluorescent lamp supporting members LSM are shifted from each other in the tube axis direction of the external electrode fluorescent lamp EFL.

When the divided fluorescent lamp supporting members LSM are viewed in a direction of FIG. 11A, a divided surface DVF1 of one fluorescent lamp supporting member LSM and a divided surface DVFr of the other fluorescent lamp supporting member LSM are overlapped with each other. When viewed in directions of FIGS. 11B and 11C, the divided fluorescent lamp supporting members LSM are shifted from each other in the tube axis direction of the external electrode fluorescent lamp EFL.

Thus, the external electrode fluorescent lamp EFL is supported by the pair of fluorescent lamp supporting members LSM separately arranged in the tube axis direction, in which one fluorescent lamp supporting member LSM1 presses one surface of the external electrode fluorescent lamp EFL in a circumferential direction, and the other fluorescent lamp supporting member LSMr presses another surface of the external electrode fluorescent lamp EFL, which faces the one surface, in the circumferential direction.

In this case, since the area of contact between one fluorescent lamp supporting member LSM and the external electrode fluorescent lamp EFL is reduced to half of the normal contact area, the configuration which makes it difficult to transfer heat can be achieved. Therefore, a change in temperature of the external electrode fluorescent lamp EFL in the tube axis direction can be reduced, with which the luminance difference can be reduced.

In the above-described configuration, one divided fluorescent lamp supporting member LSM on one side and one divided fluorescent lamp supporting member LSM on the other side are arranged in the tube axis direction of the external electrode fluorescent lamp EFL. However, two divided fluorescent lamp supporting members LSM on one side and one fluorescent lamp supporting member LSM on the other side may be alternatively arranged. This arrangement provides an effect that the support for the external electrode fluorescent lamp EFL by the fluorescent lamp supporting members LSM can be mechanically strengthened. In this case, although the number of the divided fluorescent lamp supporting members LSM on one side and the divided fluorescent lamp supporting member LSM on the other side is three in total, it is not limited thereto. The number of the divided fluorescent lamp supporting members may be three or more.

The configuration shown in Embodiment 5 can be used in combination with embodiments other than Embodiment 5.

The above-described embodiments have been described in which the fluorescent lamp supporting base LSS includes the optical sheet supporting post OSP. However, the optical sheet supporting post OSP may not be necessarily provided in the fluorescent lamp supporting base LSS because another different member may serve the function of the optical sheet supporting post OSP.

In the above-described embodiments, although two fluorescent lamp supporting members LSM are formed in the fluorescent lamp supporting base LSS to support two external electrode fluorescent lamps EFL, the configuration is not limited thereto. The embodiments can be applied to the configuration in which the fluorescent lamp supporting base LSS includes one fluorescent lamp supporting member LSM to support one external electrode fluorescent lamp EFL.

In the above-described embodiments, although the external electrode fluorescent lamp EFL is used as a light source for the backlight BL, this is not restrictive. A cold cathode fluorescent lamp or a hot cathode fluorescent lamp may be used as the light source.

What is claimed is:

1. A liquid crystal display device comprising:
a liquid crystal display panel; and
a backlight including a light source for irradiating the liquid crystal display panel, wherein
the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed,
the fluorescent lamp supporting bases each include a fluorescent lamp supporting member holding the linear fluorescent lamp and a fixing portion for fixing the fluorescent lamp supporting base to the frame, and
a recess is formed in the frame at a position where the fluorescent lamp supporting member is provided,
wherein the recess in the frame is formed at portions just behind the fluorescent lamp supporting member and the recess has a bottom surface spaced from a bottom surface of the fluorescent lamp supporting base.

2. A liquid crystal display device according to claim 1, wherein a depth of the recess is set at least equal to a height of the fluorescent lamp supporting base.

3. A liquid crystal display device according to claim 1, wherein the fixing portion of the fluorescent lamp supporting base includes an engaging portion inserted into the frame, and the engaging portion is formed at a position not overlapped with the fluorescent lamp supporting member.

4. A liquid crystal display device comprising:
a liquid crystal display panel; and
a backlight including a light source for irradiating the liquid crystal display panel, wherein
the backlight includes at least a plurality of linear fluorescent lamps arranged in parallel in a plane facing the liquid crystal display panel, fluorescent lamp supporting bases supporting the linear fluorescent lamps, and a frame to which the fluorescent lamp supporting bases are fixed,
the fluorescent lamp supporting bases each include a fluorescent lamp supporting member holding the linear fluorescent lamp and a fixing portion for fixing the fluorescent lamp supporting base to the frame, and
a recess is formed in the frame at a position where the fluorescent lamp supporting member is provided,
wherein the fixing portion of the fluorescent lamp supporting base includes an engaging portion inserted into the frame, and the engaging portion is formed at a position not overlapped with the fluorescent lamp supporting member.

* * * * *